(12) United States Patent
Velusamy

(10) Patent No.: US 8,126,972 B2
(45) Date of Patent: Feb. 28, 2012

(54) ACCESS MANAGEMENT FOR MESSAGING SYSTEMS AND METHODS

(75) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 775 days.

(21) Appl. No.: 11/935,141

(22) Filed: Nov. 5, 2007

(65) Prior Publication Data
US 2009/0119771 A1    May 7, 2009

(51) Int. Cl.
*G06F 15/16* (2006.01)
(52) U.S. Cl. .......................... 709/206; 709/202; 709/225
(58) Field of Classification Search .................. 709/206, 709/202, 225
See application file for complete search history.

(56) References Cited

U.S. PATENT DOCUMENTS

| | | |
|---|---|---|
| 2004/0003283 A1 | 1/2004 | Goodman et al. |
| 2004/0181581 A1* | 9/2004 | Kosco ........................... 709/206 |
| 2005/0044155 A1 | 2/2005 | Kaminski et al. |
| 2005/0044156 A1* | 2/2005 | Kaminski et al. ............. 709/206 |
| 2005/0081059 A1* | 4/2005 | Bandini et al. ................ 713/201 |
| 2005/0188045 A1* | 8/2005 | Katsikas ........................ 709/206 |
| 2007/0011253 A1* | 1/2007 | Taylor ........................... 709/206 |

OTHER PUBLICATIONS

Gates, Bill "Preserving and Enhancing the Benefits of Email", Jun. 28, 2004, 2 pages, http://www.microsoft.com/mscorp/execmail/2004/06-28antispam.mspx.
Hamlin, Ryan "Microsoft's Anti-Spam Initiative" May 29, 2003, 10 pages, http://www.microsoft.com/presspass/events/smspeaker/05-29spam.mspx.

* cited by examiner

*Primary Examiner* — Larry Donaghue
*Assistant Examiner* — Nicholas Taylor

(57) ABSTRACT

An exemplary system includes an access management facility and a message processing facility communicatively coupled to the access management facility. The access management facility is configured to generate and activate an access code, and initiate providing of the access code to a potential message source. The message processing facility is configured to receive an incoming message, determine whether the incoming message includes the access code, deliver the incoming message to a user if the incoming message is determined to include the access code, and not deliver the incoming message to the user if the incoming message is determined not to include the access code. In certain implementations, the access code is used in conjunction with a set of authorized message sources for selectively filtering the incoming message. In certain implementations, at least one tool is provided, the tool being configured to enable the user to manage the access code.

24 Claims, 9 Drawing Sheets

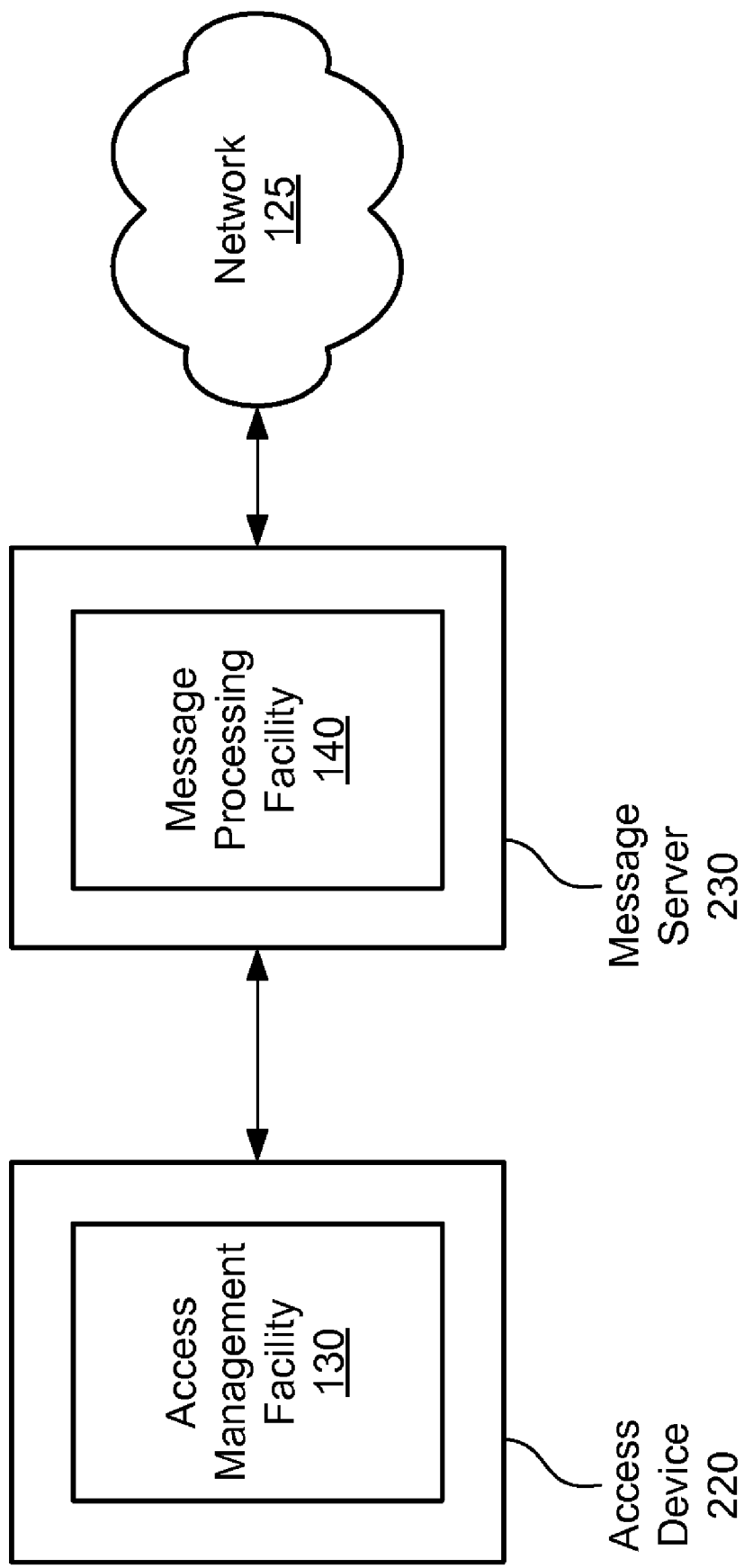

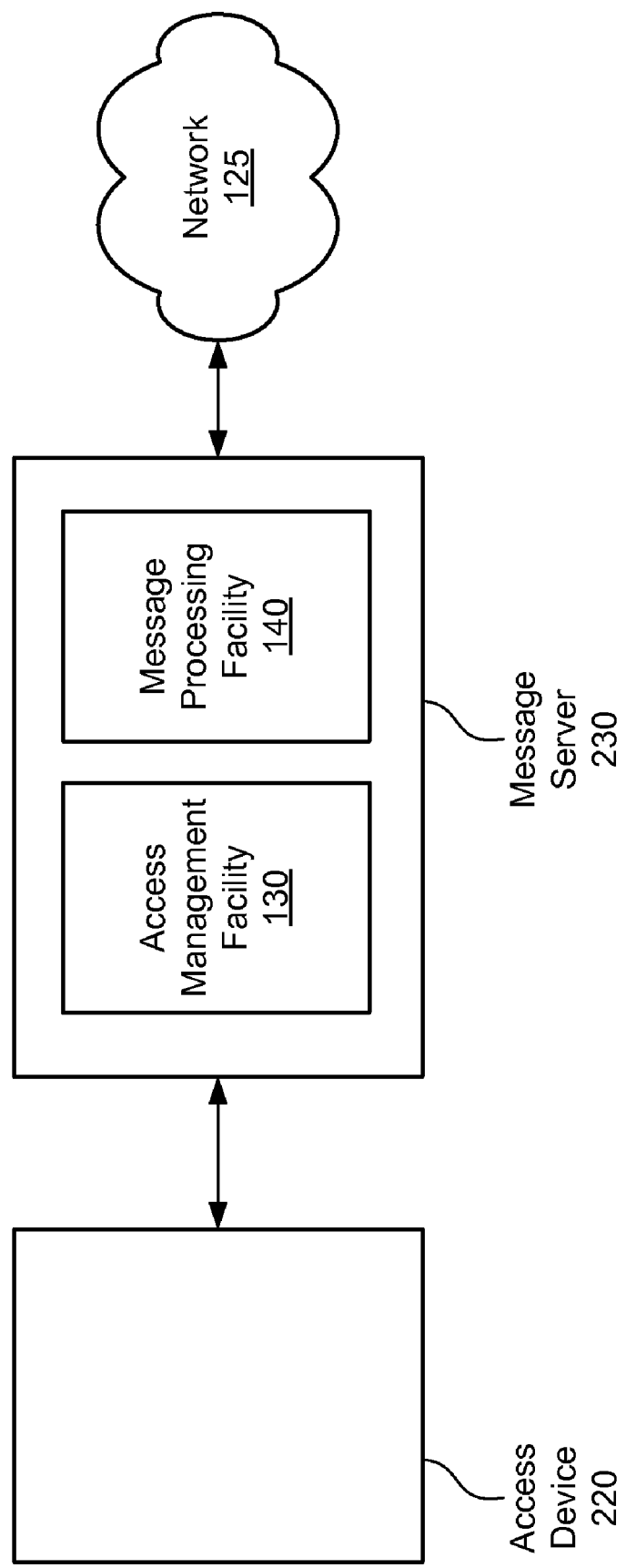

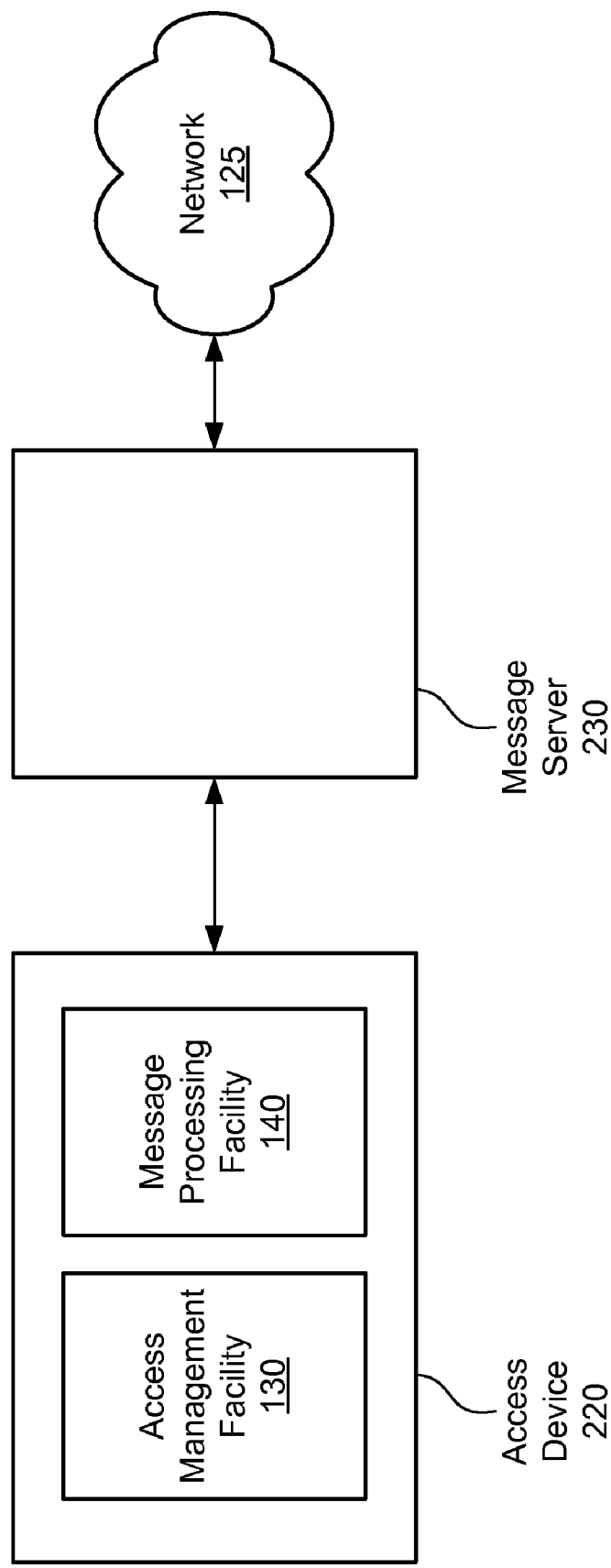

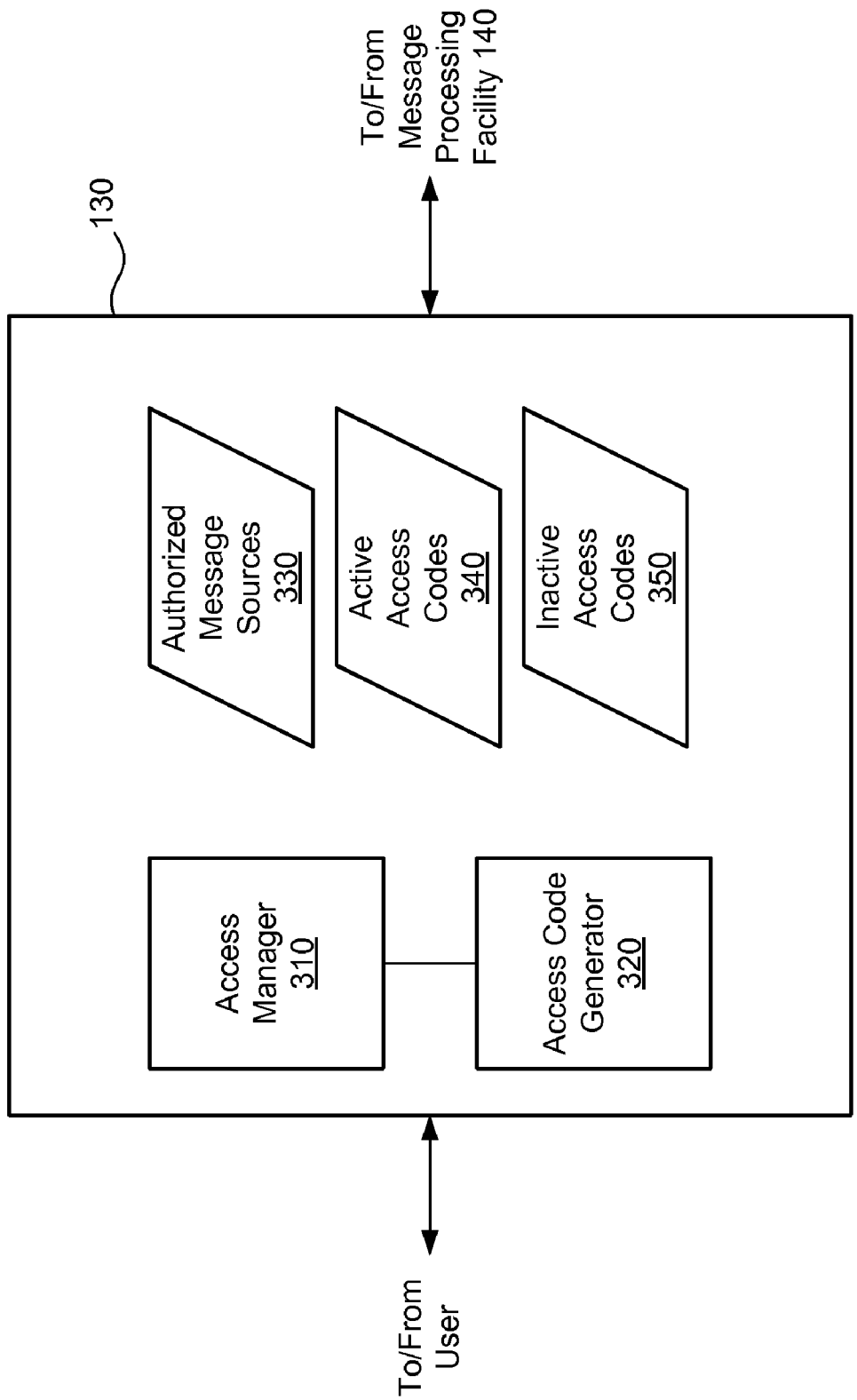

ACCESS MANAGEMENT FOR MESSAGING SYSTEMS AND METHODS

BACKGROUND INFORMATION

Advances in electronic communications technologies have interconnected people and allowed for distribution of information perhaps better than ever before. One popular form of communication is electronic mail messaging commonly known as "e-mail."

Unfortunately for users and operators of e-mail systems, e-mail has become an advertising tool widely used for mass distribution of unsolicited and unwanted e-mail messages, which are commonly referred to as "SPAM." It is a challenge for users and operators of e-mail systems to effectively deal with SPAM without inadvertently affecting legitimate e-mail messages. To this end, SPAM filters have been designed. To some extent SPAM filters help prevent SPAM from reaching users, but conventional SPAM filters are fraught with problems. For example, a typical SPAM filter relies on tools for scanning the contents of incoming e-mail messages. However, the scanning of content invades privacy and requires significant computing resources. In addition, senders of SPAM have become adept at quickly working around conventional SPAM filters. Consequently, operators of e-mail systems typically invest significant resources in what has become a continual battle against SPAM and senders of SPAM.

Once a user's e-mail address is exposed to unscrupulous senders of SPAM, it is extremely difficult, if not impossible, for the user to stop the barrage of SPAM that typically follows. In some cases, the SPAM may become overwhelming and force a user to spend significant time dealing with the SPAM (e.g., manually deleting the SPAM) or to relinquish the user's e-mail address in order to avoid the SPAM. However, relinquishing an e-mail address is not trivial and typically includes setting up and notifying personal contacts of a new e-mail address. Even after taking these steps, the user may inadvertently miss legitimate e-mail messages sent to the old e-mail address, or be forced to continue to check the old e-mail address for such messages.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

FIG. 2A illustrates an exemplary configuration of a messaging subsystem.

FIG. 2B illustrates another exemplary configuration of a messaging subsystem.

FIG. 2C illustrates yet another exemplary configuration of a messaging subsystem.

FIG. 3 illustrates components of an exemplary access management facility.

DETAILED DESCRIPTION OF PREFERRED EMBODIMENTS

Figure 1:
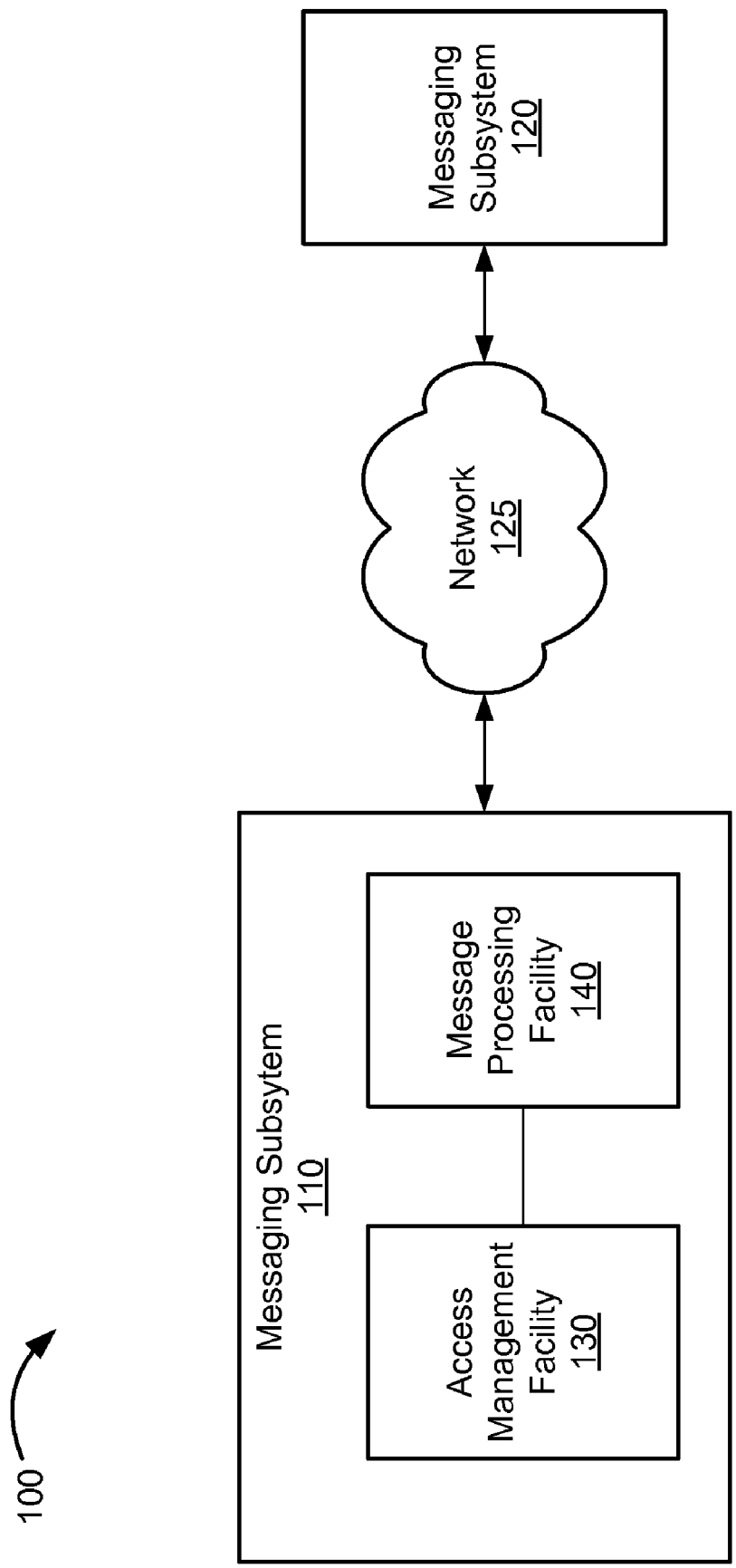
FIG. 1 illustrates an exemplary electronic messaging system.

Exemplary messaging systems and methods are described herein. In an exemplary implementation, a system includes an access management facility and a message processing facility communicatively coupled to the access management facility. The access management facility may be configured to generate and activate an access code, and initiate providing of the access code to a potential message source. The message processing facility may be configured to receive an incoming message (e.g., an e-mail message) and selectively filter the incoming message based on the access code. In certain implementations, the message processing facility may be configured to determine whether the incoming message includes the access code. The incoming message may be delivered to a user when the incoming message includes the access code. The incoming message may be not delivered to the user when the incoming message does not include the access code.

When the incoming message is not delivered to the user, the message processing facility may provide a response message to the source of the undelivered incoming message. The response message may include notification of the non-delivery and of a missing access code. The response message may be configured to facilitate the source of the undelivered incoming message requesting the access code.

In certain implementations, the access code may have a life span, which may be defined based on input received from the user. The access management facility may be configured to automatically deactivate the access code based on the life span such that the deactivated access code is no longer a valid basis for delivering incoming messages to the user. Alternatively or additionally, the user may selectively instruct the access management subsystem to activate and deactivate the access code. Accordingly, the user may conveniently manage the use of access codes to filter incoming messages.

Access codes may be used in conjunction with other filtering criteria. For example, an access code and a set of authorized message sources (e.g., a list of authorized e-mail addresses or domain names) may be used to selectively filter incoming messages. In an exemplary implementation, for example, a system includes an access management facility and a message processing facility communicatively coupled to the access management facility. The access management facility may be configured to maintain data representing a set of authorized message sources, generate and activate an access code, and initiate providing of the access code to a potential message source. The message processing facility may be configured to receive an incoming message and selectively filter the incoming message based on the set of authorized message sources and/or the access code. In certain implementations, the incoming message may be selectively delivered to a user either when the source of the incoming message is represented in the set of authorized message sources or when the incoming message includes the access code. In certain implementations, the set of authorized message sources may be a first basis and the access code a second basis for selectively filtering the incoming message.

The exemplary systems and methods described herein may provide a user of a messaging subsystem with significant control over the filtering of incoming messages. The access management facility may provide one or more tools configured to enable the user to define a set of authorized message sources. Additionally or alternatively, the user may utilize the provided tools to manage, including generating, activating, deactivating, and modifying, one or more access codes that can be used to filter incoming messages. Access codes may provide the user with a way to conveniently control acceptance of incoming messages from message sources that are not included in the set of authorized message sources. Accordingly, the user can control filtering of messages without having to update the authorized message sources. This can be especially useful when the user wishes to receive a message from a particular source but does not know the address of the source from which the message will be sent, or when the user wishes to configure a message filter to deliver one or more messages from the source on a temporary basis. Life spans of access codes can be defined and enforced to ensure temporary use of the access codes as a basis for delivering an incoming message to the user.

As an example, a user of a messaging system may wish to register for or request information about a service offered by a service provider. The user may fill in an online form such as a web page form to request information and provide the user's messaging address (e.g., an e-mail address) to the service provider. The user may wish to have control over the receipt of messages from the service provider, and may even wish to receive only a single message from the service provider. To this end, the user may facilitate generation and activation of an access code. The access code may be provided to the service provider. For example, the user may insert the access code in the online form or in an initial message (e.g., an e-mail message) that may be sent to the service provider. With this information, the service provider can create and send a message including the access code to the user's messaging address.

With the access code activated, any incoming messages from the service provider will be checked for the access code. An incoming message from the service provider that includes the active access code will be delivered to the user. However, without an active access code included therein, incoming messages from the service provider may be not delivered to the user.

In the above example, while the user has divulged the user's messaging address to the service provider, the user maintains control over acceptance of messages from the service provider. For instance, the service provider may add the user's messaging address to an advertisement distribution list. If the user does not wish to receive such messages from the service provider, the user may simply deactivate the access code. If the user wishes to receive such messages from the service provider, the user may allow the access code to remain active, or the user may add the service provider to the set of authorized message sources. In this or similar manner, access codes provide users with significant control and capability for combating invasive and unwanted messaging practices, including SPAM.

Exemplary implementations of messaging systems and methods will now be described with reference to the accompanying drawings.

FIG. 1 illustrates an exemplary messaging system 100 (or simply "system 100"). As shown in FIG. 1, system 100 may include messaging subsystems 110 and 120 configured to selectively communicate with one another by way of a network 125. Messaging subsystems 110 and 120 may communicate over network 125 using any suitable communication platforms, devices, and technologies, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Short Message Service ("SMS"), Multimedia Message Service ("MMS"), other electronic messaging protocols (e.g., e-mail protocols), Ethernet, in-band and out-of-band signaling technologies, and/or any other suitable communications technologies.

Network 125 may include one or more networks, including, but not limited to, closed communication networks, open communication networks, data networks, the Internet, intranets, local area networks, wireless networks (e.g., Wi-Fi networks), mobile telephone networks (e.g., cellular telephone networks), optical fiber networks, broadband networks, and/or any other networks capable of carrying data representative of electronic messages and associated communications signals between messaging subsystems 110 and 120. Communications between the messaging subsystems 110 and 102 may be transported over any one of the above-listed networks, or any combination or sub-combination of the above-listed networks.

While FIG. 1 shows two messaging subsystems 110 and 120, this is illustrative only. Additional messaging subsystems may be configured for sending and receiving messages and associated signals over network 125.

Exemplary components and configurations of messaging subsystem 110 will now be described. While the below description is directed to messaging subsystem 110, it will be understood that messaging subsystem 120 may be configured similarly to or differently from messaging subsystem 110. Messaging subsystem 120 may be configured to perform any of the processes described herein and/or may employ standard electronic messaging technologies. Accordingly, messaging subsystem 110 may be configured to communicate with any suitable messaging subsystem, including known messaging subsystems (e.g., known e-mail subsystems).

Messaging subsystem 110 may include any devices and technologies configured to enable sending and/or receiving of messages to/from messaging subsystem 120 over network 125, including any known technologies for sending, receiving, and processing electronic messages. Electronic messages may comprise or employ any suitable messaging formats and technologies, and may include e-mail messages, text messages, SMS messages, MMS messages, and/or electronic pages, for example.

In some examples, messaging subsystem 110 may include any computer hardware and/or instructions (e.g., software programs), or combinations of software and hardware, configured to perform the processes described herein. In particular, it should be understood that components of messaging subsystem 110 may be implemented on one physical computing device or may be implemented on more than one physical computing device. Accordingly, messaging subsystem 110 may include any one of a number of computing devices, and may employ any of a number of computer operating systems, including, but by no means limited to, known versions and/or varieties of the Microsoft Windows® operating system, the UNIX operating system, Macintosh® operating system, and the Linux® operating system.

Accordingly, the processes described herein may be implemented at least in part as computer-executable instructions, i.e., instructions executable by one or more computing devices, tangibly embodied in one or more computer-readable media. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

As shown in FIG. 1, messaging subsystem 110 may include an access management facility 130 and a message processing facility 140 communicatively coupled to one another. Access management facility 130 and message processing facility 140 may include and/or be implemented in one or more computing devices capable of being configured to perform one or more of the processes disclosed herein. In certain implementations, access management facility 130 and message processing facility 140 include computer instructions (e.g., software) tangibly embodied in one or more computer-readable media and configured to direct one or more computing devices to execute one or more of the processes described herein.

Figure 2D:
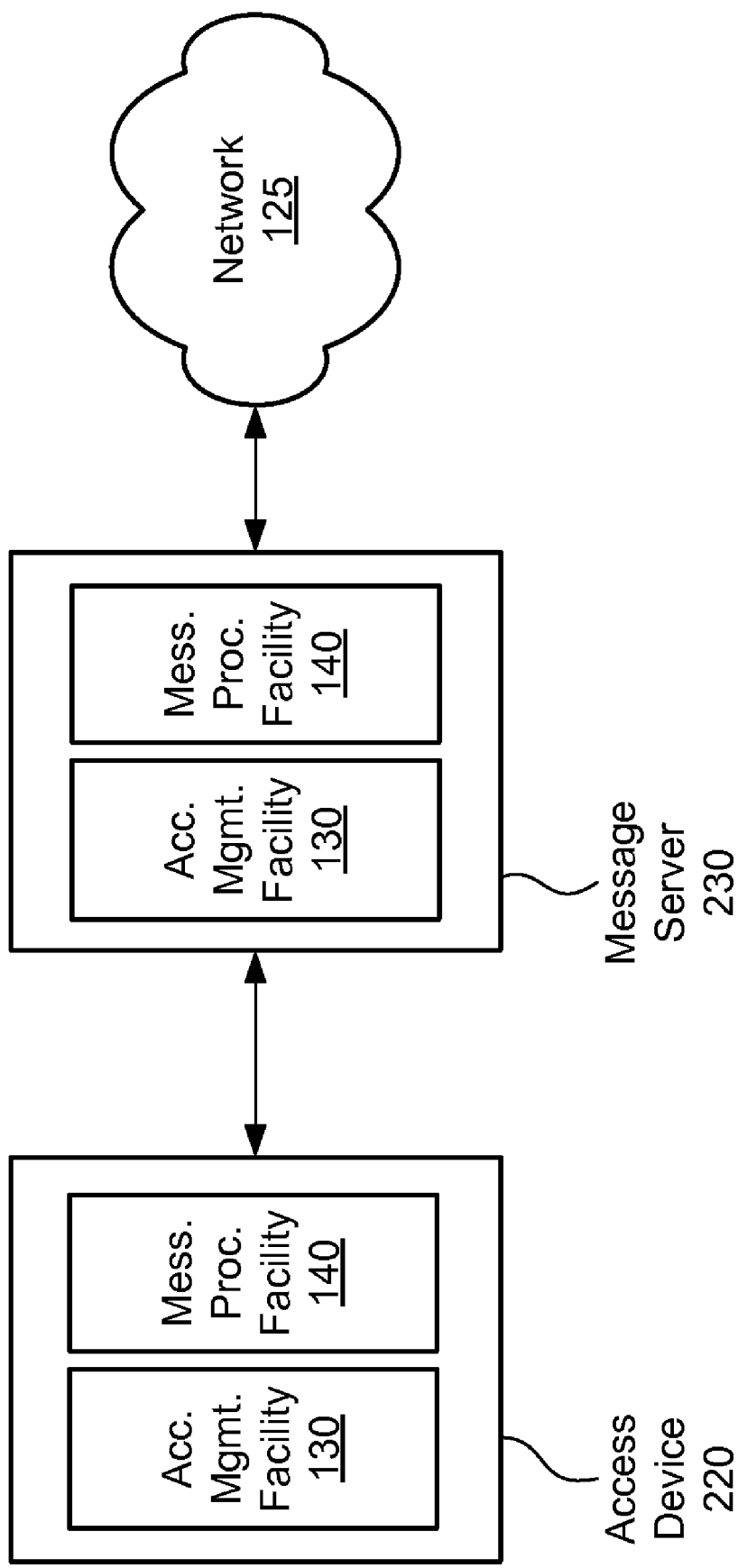
FIG. 2D illustrates yet another exemplary configuration of a messaging subsystem.

Access management facility 130 and message processing facility 140 may be implemented in any suitable way as may suit a particular implementation. FIGS. 2A-2D illustrate exemplary configurations of access management facility 130 and message processing facility 140. FIG. 2A illustrates an exemplary configuration in which access management facility 130 is implemented in an access device 220 and message processing facility 140 is implemented in a message server 230.

Message server 230 may include one or more network-side devices and/or computer-readable instructions configured to transmit and receive data representative of or otherwise associated with electronic messages over network 125. Message server 230 may include any suitable messaging technologies and devices, including one or more e-mail servers (e.g., Post Office Protocol 3 ("POP-3") servers and Microsoft Exchange Servers), mail transfer agents ("MTAs"), mail delivery agents, and mail exchangers. Message server 230 may be configured to receive and deliver messages from/to access device 220, including selectively filtering and delivering incoming messages to a user of access device 220 as described below.

Access device 220 may include any device physically or remotely accessible to one or more users and that allows a user to access services provided by messaging subsystem 110, including using message server 230 for sending and receiving messages over network 125 and for delivering incoming messages to the user. Access device 220 and message server 230 may communicate using any suitable communication technologies, including any of the technologies disclosed herein. In certain implementations, communications between access device 220 and message server 230 may be transmitted over network 125.

Access device 220 may include, but is not limited to, one or more desktop computers, laptop computers, tablet computers, personal computers, personal data assistants, wireless communication devices (e.g., cellular telephones and satellite pagers), wireless internet devices, embedded computers, client-side devices, and any other devices capable of providing user access to one or more messaging services and tools provided by messaging subsystem 110. Access device 220 may also include and/or be configured to interact with various peripherals such as a terminal, keyboard, mouse, display screen, printer, stylus, input device, output device, or any other apparatus that can help provide interaction with access device 220.

As mentioned, in FIG. 2A, access management facility 130 is implemented in access device 220, and message processing facility 140 is implemented in message server 230. However, this is illustrative only. Other configurations of access management facility 130 and message processing facility 140 may be used. FIG. 2B illustrates another exemplary configuration in which both access management facility 130 and message processing facility 140 are implemented in message server 230. Such a configuration may be suitable for server-based messaging services, including web-based messaging services (e.g., web-based e-mail services). Access device 220 may be configured to access server-side messaging services through any suitable user interface (e.g., a web browser for web-based messaging services).

FIG. 2C illustrates another exemplary configuration in which both access management facility 130 and message processing facility 140 are implemented within access device 220. Such a configuration may be implemented where it is desirable to have client-side filtering functions performed. FIG. 2D illustrates yet another exemplary configuration in which both access management facility 130 and message processing facility 140 are respectively distributed across message server 230 and access device 220. In view of the exemplary configurations shown in FIGS. 2A-D, access management facility 130 and/or message processing facility 140 may configure access device 220 and/or message server 230 to perform any of the processes described herein.

Exemplary components and functionalities of the access management facility 130 and message processing facility 140 of the messaging subsystem 110 will now be described. FIG. 3 illustrates exemplary components of the access management facility 130. While an exemplary access management facility 130 is shown in FIG. 3, the exemplary components illustrated in FIG. 3 are not intended to be limiting. Indeed, additional or alternative components and/or implementations may be used.

As shown in FIG. 3, access management facility 130 may include an access manager 310, access code generator 320, and data representing authorized message sources 330, active access codes 340, and inactive access codes 350. Access manager 310 may be configured to provide a user of access device 220 with one or more tools configured to enable the user to control filtering of incoming messages. For example, access manager 310 may provide the user with one or more tools for defining, modifying, and otherwise managing a set of authorized message sources, which is represented as reference number 330 in FIG. 3. As used herein, the term "message source" may refer to any sender or potential sender of a message to messaging subsystem 110, including users and/or devices involved in sending the message. The set of authorized message sources 330 may include a list of message source identifiers, including, but not limited to messaging addresses (e.g., e-mail addresses) and domain identifiers (e.g., domain names).

Examples of tools for managing the set of authorized message sources 330 may include user interface tools enabling the user to create and manage the set of authorized message sources 330. In certain implementations, for example, access manager 310 may be configured to provide a pre-populated list of message source identifiers from which the user may select message sources to be included in the set of authorized message sources 330, such as by dragging and dropping visual objects representative of the message sources or message source identifiers. The pre-populated list of message sources identifiers may be generated by access manager 310 and may include any message source identifiers associated with people or organizations. In certain embodiments, an operator of messaging subsystem 110 may collect revenue from the people or organizations for placement of their information in the pre-populated list.

The pre-populated list may include ratings of the message sources included therein. For example, certain message sources may be assigned "trusted source" ratings while other message sources may be assigned other ratings such as "uncertain," "insufficient data," or "untrusted" ratings. The ratings may be determined based on any suitable criteria, including historical messaging data and/or user feedback. The ratings may assist the user in creating a custom set of authorized message sources 330 from the pre-populated list.

In certain implementations, the pre-populated list may be generated from user messaging data, including records of previously received and/or sent messages. For example, the pre-populated list may pull data from a user's message inbox and/or outbox.

Alternative or in addition to enabling the user to manage the set of authorized message sources 330, access manager 310 may be configured to automatically include entries in the set of authorized message sources 330. For example, when the user sends an outgoing message to a particular messaging source, the messaging address of the source may be automatically added to the set of authorized message sources 330. In similar fashion, message source information may be pulled from other locations (e.g., a message inbox) and automatically included in the set of authorized message sources 330.

As described further below, the set of authorized message sources 330 may be used to selectively filter incoming messages. In certain implementations, the set of authorized message sources 330 may be used as a first basis for selectively filtering incoming messages.

Access manager 310 may be configured to provide the user with one or more tools for generating, activating, deactivating, modifying, and otherwise managing one or more access codes. The tools may be presented in a user interface. The tools may be configured to enable the user to provide user input specifying one or more criteria to be used for generating an access code, including at least one attribute of a potential message source (e.g., a domain name or messaging address). For example, one or more predefined user interface fields may be provided in which such attribute information may be provided.

The tools may be configured to enable the user to define a life span of an access code. For example, utilizing the tools a user may define a life span based on a time period (e.g., one day or week after activation) and/or on a maximum number of uses. For instance, the user may utilize the tools to define a number of times an activated access code may be used as the basis for allowing delivery of one or more messages to a user. Alternatively, the user may define the life span of an access code as being open, in which case the user may utilize one or more of the tools to terminate the life span. At the end of a life span, the access code may be automatically deactivated. Hence, an access code may be deactivated by access manager 310 in response to user input or automatically based on the defined life span of the access code. For example, a one-time-use access code will be automatically deactivated once it has been used one time as the basis for delivering an incoming message to the user.

Access code generator 320 may be configured to generate one or more access codes. Access codes may be generated using random code generation heuristics and/or may be based at least in part on user input or other predetermined factors. In certain implementations, for example, access code generator 320 may be configured to utilize a domain name or other attribute of a particular potential message source to generate an access code. This may help tailor access codes to specific message sources and/or provide a layer of security against unpermitted use of access codes.

Other security measures may be implemented in relation to generating and protecting access codes. For example, access code generator 320 may be configured to request and verify user input before generating or activating the access code. For instance, the user may be shown an image and asked for input verifying the content of the image. This may provide a layer of security against attempts to hijack access code generator 320, especially from automated hijack attempts.

Access codes may be activated. Activation of access codes refers to the access codes being configured for use as a basis for filtering incoming messages. For example, one or more message filters may be configured to check incoming messages and determine whether the messages include any of the active access codes.

Data representing active access codes may be maintained by access management subsystem 130, as represented by reference number 340 in FIG. 3. Active access codes 340 may be used to selectively filter incoming messages as described further below, including as a second basis for filtering incoming messages in certain implementations.

Active access codes 340 may be deactivated by access manager 310 in response to any of the events described herein (e.g., at the end of a life span or in response to user input). Deactivation may include reconfiguring one or more message filters such that they will no longer use the access codes as a basis for delivering incoming messages to a user. Data representing deactivated access codes is represented as reference number 350 in FIG. 3.

Data representing deactivated access codes 350 may be maintained and used to ensure generation and activation of unique access codes. For example, a generated access code may be checked against the deactivated access codes to verify it is not repetitive of a previously used access code. This can provide a layer of security and control by ensuring that a previously used access code is not inadvertently reactivated.

Access codes may be provided to potential message sources from which a user wishes to receive one or more messages. For example, a generated access code may be provided to a particular potential message source such that the potential message source (e.g., messaging subsystem 120)

may generate a message, include the access code in the message, and send the message to messaging subsystem 110.

The access code may be provided to the potential message source in any suitable way. For example, the user may input the access code into a web page or other online form for upload to the potential message source. Hence, a potential message source may configure an online form to receive access codes from users who provide contact information. As another example, access manager 310 may be configured to initiate sending of an initial message to the potential message source. The initial message may be configured to facilitate the potential message source gaining access to an access code. For instance, the message may include instructions to be followed to request an access code. For instance, the message may include questions to be answered by the potential message source in order to obtain an access code. Alternatively or additionally, the message may include a link to a web page in which a request for an access code may be created and uploaded, and in which an access code may be provided to the potential message source. Messaging subsystem 110 may be configured to provide such a web page as a way for controllably providing access codes to potential message sources. The web pages may be temporary and/or secured for access only by selected potential message senders. In this or similar manner, access management facility 130 may be configured to initiate providing of the access code to the potential message source, such as by initiating launch of a web page or sending of an initial message. Of course, other suitable ways of providing an access code to a potential message source may be employed in other implementations.

As another example, an initial message to the potential message provider may include a link, which when utilized by the potential message provider, is configured to add data representing the potential message provider (e.g., an e-mail address) to the authorized message sources 330. This may allow a user to provide a potential message sender with a convenient way for gaining access to the messaging subsystem 110. As compared to using an access code, a link configured to facilitate adding of the potential message source to the authorized message sources 330 may provide a more permanent basis for allowing delivery of messages from the message source. In certain implementations, this may provide the user with a choice as to what basis will be used for allowing delivery of messages from the potential message source.

Access manager 310 may be configured to screen and/or facilitate screening of a request for an access code and/or a request to be added to the authorized message sources 330. Screening may include using automated heuristics configured to verify inclusion of predetermined information, manual user approval or rejection of the request, or a combination thereof. In certain implementations, access manager 310 may be configured to notify the user of the request if the request satisfies predetermined screening criteria and allow the user to selectively provide or not provide the requested access code. In this manner, the user may be notified of a potential, legitimate message source attempting to contact the user via messaging subsystem 110 or requesting authorization for delivery of messages to the user. In some examples, the user may be charged a fee to receive such notifications.

Figure 4:
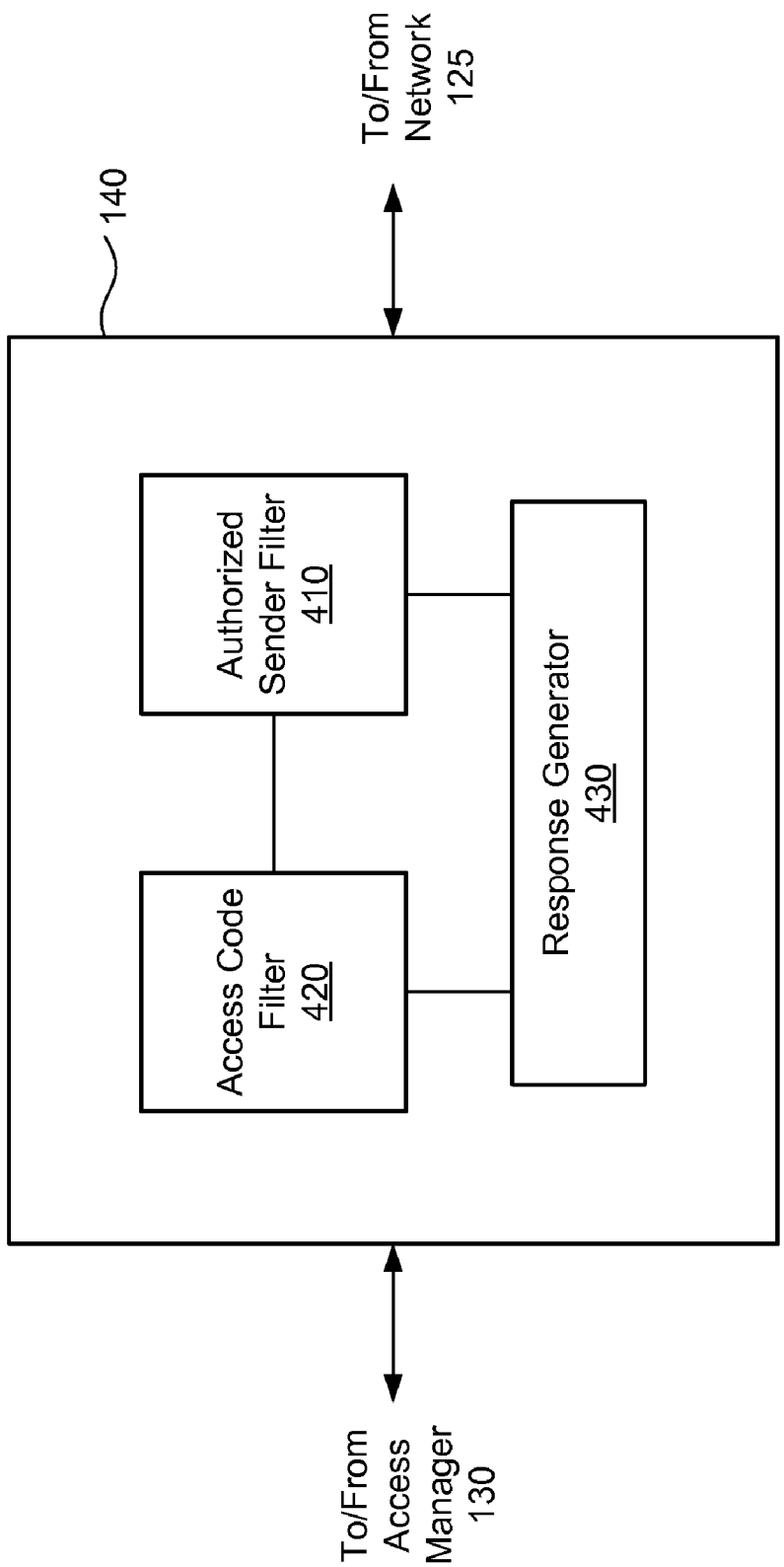
FIG. 4 illustrates components of an exemplary message processing facility.

Exemplary filtering of incoming messages will now be described. FIG. 4 illustrates exemplary components of message processing facility 140. While an exemplary message processing facility 140 is shown in FIG. 4, the exemplary components illustrated in FIG. 4 are not intended to be limiting. Indeed, additional or alternative components and/or implementations may be used.

As shown in FIG. 4, message processing facility 140 may include an authorized sender filter 410, access code filter 420, and response generator 430. Message processing facility 140 may be configured to receive incoming messages over network 125 and selectively filter the messages based on the authorized message source 330 and/or active access codes 340. Known message processing technologies may also be used for processing incoming messages, including known technologies for authenticating the sources (e.g., source identifiers or addresses) of the messages.

Authorized sender filter 410 may be configured to filter incoming messages based on the data representing a set of authorized message sources 330. In certain implementations, for example, the source of an incoming message may be authenticated and the set of authorized message sources 330 queried for a match. If data representing the source is included in the set of authorized message sources 330, the incoming message may be delivered to the user. That is, authorized sender filter 410 may allow the incoming message to be delivered for access by the user. On the other hand, if a match for the source of the incoming message is not included in the set of authorized message sources 330, further processing may be performed, including filtering the incoming message at the access code filter 420.

Access code filter 420 may be configured to filter incoming messages based on active access codes 340. In certain implementations, for example, access code filter 420 may be configured to determine whether an incoming message includes an active access code.

Determining whether the incoming message includes an active access code may include determining whether an access code included in the incoming message is a valid access code for the source of the message. For example, a generated access code may be associated with a particular message source, and an access code in an incoming message may be compared to an attribute of the message source (e.g., source domain name or messaging address) to determine whether the access code is indeed the valid access code associated with message source. This may provide a layer of security such that an access code intended for use by a particular message source is not inadvertently used to allow delivery of an incoming message from another message source. In addition, unscrupulous message sources may be prevented from passing around an access code.

If the incoming message is determined to include a valid and active access code, the incoming message may be delivered to the user. That is, access code filter 420 may allow the incoming message to be delivered for access by the user. In certain implementations, the access code may be automatically deactivated in response to it being used as the basis for allowing delivery of the incoming message to the user.

If the incoming message does not include a valid and active access code, further processing may be performed, including not delivering the incoming message to the user. In addition, response generator 430 may be configured to authenticate the message source, and generate and provide a response message (e.g., a reply e-mail message) to the message source over network 125. The response message may be configured to notify the message source of the non-delivery of the incoming message and/or the incoming message missing a valid and active access code.

In some examples, the response message may be configured to facilitate the message source requesting and/or providing an access code. For example, the response message may include instructions directing the message source in preparing and submitting a request for an access code, or questions to be answered by the message source to request an access code. Alternatively or additionally, the response message may include a link to such instructions or questions, such as a link to a web page provided by messaging subsystem 110 and configured to enable the message source to submit a request for an access code. A request for an access code may be processed by messaging subsystem 110 and an access code selectively provided in any of the ways described above.

In certain implementations, the response message may be configured to solicit an access code from the message source. For example, the response message may indicate that the incoming message was not delivered to the user because it lacked an appropriate access code. The response message may further request the message source to provide an access code, such as by reply message or in a new message. This may provide the message source with a way to correct a problem such as having simply forgotten to include the access code in a message.

In certain implementations, the response message may be configured to provide the message source with a way for data representing the message source to be added to the authorized message sources 330. For example, the response message may include a link that when selected by the message source is configured to instruct the access management facility 130 to automatically add data representing the message source to the authorized message sources 330.

A response message may be selectively provided to a message source based on one or more predefined criteria and/or user input. For example, access management facility 130 may be configured to notify a user of a non-delivered message and request input from the user as to whether to send a response message and/or which type of response message to send. Examples of criteria that may be used for selectively sending response messages may include any criteria associated with the message source, such as a domain identifier associated with the message source.

In certain implementations, authorized sender filter 410 may be configured to function as a first filter in series with access code filter 420 configured to function as a second filter. Thus, an incoming message may be first processed by authorized sender filter 410 before being processed by access code filter 420. Accordingly, the set of authorized message sources 330 may be a first basis and active access codes 340 may be a second basis for filtering incoming messages. Of course, the filters 410 and 420 may be configured differently in other implementations, including omitting the authorized sender filter 410.

The use of access codes 340 in conjunction with the set of authorized message sources 330 may form a beneficial compliment. For example, a user may define the set of authorized message sources 330 as a more permanent basis for filtering incoming messages, while the access codes 340 may be utilized as a more temporary basis for filtering incoming messages, such as a initial message from a particular source.

Based on the above description, a user of messaging subsystem 110 may be provided with significant control over how incoming messages are filtered. Messaging subsystem 110 enables a user to maintain control of filtering criteria in a manner that may eliminate, or at least significantly reduce, the amount of unwanted and unsolicited messages that is delivered to the user. By being able to control access codes and their life spans, the user can temporarily open a filter to accept and delivery one or more messages from certain sources. The filter can be closed to the same sources automatically or in response to user input, as described above.

To facilitate an understanding of the principles described herein, an example of a user utilizing messaging subsystem 110 will now be described. The example is described in the context of e-mail messages for illustrative purposes only. The functionalities of messaging subsystem 110 may be similarly applied to other types of electronic messaging including text messaging such as SMS and/or MMS messaging commonly used in wireless telephone networks. Application of the principles described herein may help a user of text messaging in a wireless telephone network save money inasmuch as some such services charge users for each text message received or sent, including unwanted or unsolicited text messages. The use of response messages as described above may be especially beneficial in a wireless telephone network for notifying a sender of a text message of when the message has not been delivered to a user.

In the example, a user of messaging subsystem 110 may utilize one or more tools provided by access management facility 130 to define a set of authorized message sources 310 to include a list of e-mail addresses and/or domain names from which the user will accept messages. Accordingly, authorized sender filter 410 may be configured to allow incoming e-mail messages from the authorized sources in the list to be delivered to the user.

Using one or more of the tools, the user may instruct access code generator 320 to generate and activate one or more active access codes 340. An active access code may be provided to a potential message source such as a device or sender associated with messaging subsystem 120. The access code may be provided in any of the ways described herein. For example, the user may provide the access code and the user's e-mail address in an online form associated with messaging subsystem 120. With this information, messaging subsystem 120 can generate and send an e-mail message including the access code to the user's e-mail address.

Message processing facility 140 may receive an incoming e-mail message from the message source and selectively filter the e-mail message based on the set of authorized massage sources 310 and/or the access code. If the message source is not represented in the set of authorized message sources 310, the e-mail message may still be delivered to the user if the access code is included in the incoming message. In some implementations, the access code may be a one-time-use access code and may consequently be deactivated after being used as the basis for delivering the e-mail message to the user.

Based on the above description, the user may utilize the access code to open a messaging filter to allow delivery of an initial message from a new source, which may be routine when signing up for a new service or membership, requesting information from a new source, or establishing first-time messaging communications with a new person or organization.

Figure 5:
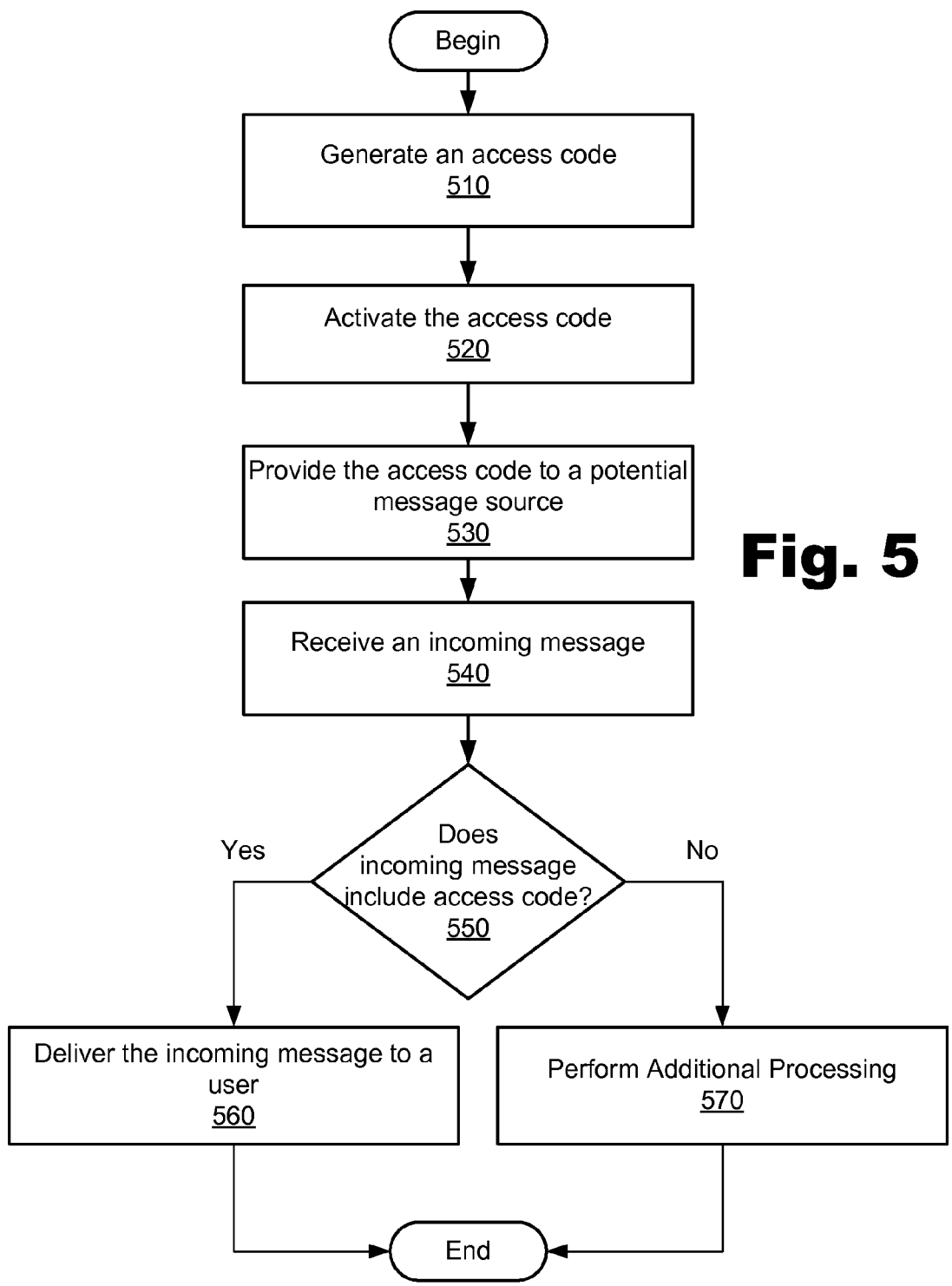
FIG. 5 illustrates an exemplary messaging process.

FIG. 5 illustrates an exemplary messaging method. While FIG. 5 illustrates exemplary steps according to one implementation, other implementations may omit, add to, reorder, and/or modify any of the steps shown in FIG. 5.

In step 510, an access code is generated. Step 510 may be performed in any of the ways described above, including access code generator 320 generating the access code.

In step 520, the access code is activated. Step 520 may be performed in any of the ways described above, including access code filter 420 being configured to utilize the access code as a basis for delivering incoming messages to a user of messaging subsystem 110.

In step 530, the access code is provided to a potential message source. Step 530 may be performed in any of the ways described above, including access management facility 130 initiating providing of the access code or instructions for obtaining the access code.

In step 540, an incoming message is received. Step 540 may be performed in any of the ways described above, including message processing facility 140 receiving the incoming message over network. The incoming message may be received from any message source, including the potential message source to which the access code was provided in step 530.

In step 550, it is determined whether the incoming message includes the access code. Step 550 may be performed in any of the ways described above, including access code filter 420 using data representing active access codes 340 to make the determination. Step 550 may include validating the access code, which may include verifying that the access code is valid for the source of the incoming message.

If the access code is determined to be included in the incoming message, the process continues to step 560. In step 560, the incoming message is delivered to the user. Step 560 may be performed in any of the ways described above, including access code filter 420 delivering the incoming message to the user. The process then ends.

Returning to step 550, if the access code is determined not to be included in the incoming message, the process continues to step 570. In step 570, additional processing is performed. The additional processing may include not delivering the incoming message to the user and sending a response message to the source of the incoming message. The additional processing may also include processing an access code request received from the message source. The process then ends. Alternatively, the process may continue at step 540 when another incoming message is received.

Figure 6:
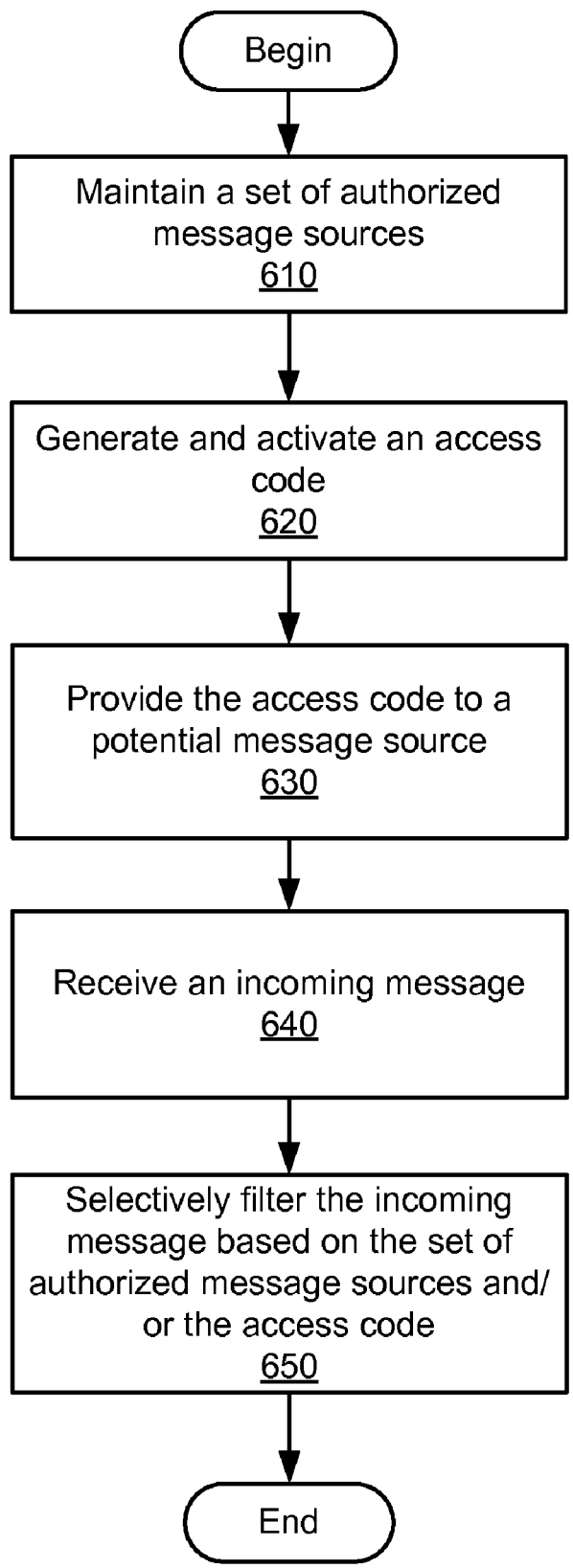
FIG. 6 illustrates another exemplary messaging process.

FIG. 6 illustrates another exemplary messaging method. While FIG. 6 illustrates exemplary steps according to one implementation, other implementations may omit, add to, reorder, and/or modify any of the steps shown in FIG. 6.

In step 610, a set of authorized message sources 340 is maintained. Step 610 may be performed in any of the ways described above, including access management facility 130 maintaining data representing the set of authorized of message sources 340.

In step 620, an access code is generated and activated. Step 620 may be performed in any of the ways described above, including access code generator 320 generating and activating the access code.

In step 630, the access code is provided to a potential message source. Step 630 may be performed in any of the ways described above, including access management facility 130 initiating providing of the access code or instructions for obtaining the access code.

In step 640, an incoming message is received. Step 640 may be performed in any of the ways described above, including message processing facility 140 receiving the incoming message over network. The incoming message may be received from any message source, including the potential message source to which the access code was provided in step 630.

In step 650, the incoming message is selectively filtered based on the set of authorized message sources 330 and/or the access code. Step 650 may be performed in any of the ways described above, including authorized sender filter 410 and access code filter 420 working in series to respectively utilize the set of authorized message sources 330 as a first basis and the access code as a second basis for filtering the incoming message.

In the preceding description, various exemplary implementations have been described with reference to the accompanying drawings. It will, however, be evident that various modifications and changes may be made thereto, and additional implementations may be implemented, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A system comprising:
   at least one computing device implementing an access management facility and a message processing facility communicatively coupled to the access management facility;
   the access management facility configured to
      generate a pre-populated list of potential authorized message sources from messaging data in a user message box,
      receive a selection, from a user, of at least one potential authorized message source from said pre-populated list of potential authorized message sources,
      maintain data representing said selected potential authorized message source as one authorized message source in a set of authorized message sources,
      generate and activate an access code,
      transmit said access code to a potential message source, and
      maintain data representing said potential message source as another authorized message source in said set of authorized message sources; and
   the message processing facility configured to
      receive an incoming message;
      determine whether a source of said incoming message is included in said set of authorized message sources;
      deliver said incoming message to said user if said source of said incoming message is determined to be included in said set of authorized message sources, and
      if said source of said incoming message is determined not to be included in said set of authorized message sources,
         determine whether said incoming message includes said access code,
         deliver said incoming message to said user if said incoming message is determined to include said access code, and
         not deliver said incoming message to said user if said incoming message is determined not to include said access code.

2. The system of claim 1, wherein the message processing facility is configured to:
   authenticate said source of said incoming message; and
   send a response message to said source of said incoming message in response to said non-delivery of said incoming message to said user, said response message including notification of said non-delivery and of said incoming message missing said access code.

3. The system of claim 2, wherein said response message is configured to facilitate said source of said incoming message requesting said access code.

4. The system of claim 1, wherein the access management facility is configured to automatically deactivate said access code in response to said incoming message being delivered to said user if said incoming message is determined to include said access code.

5. The system of claim 1, wherein the access management facility is configured to provide at least one tool configured to enable said user to selectively instruct the access management facility to activate and deactivate said transmitted access code.

6. The system of claim 1, wherein the access management facility is configured to generate said access code based at least in part on at least one attribute associated with said potential message source.

7. The system of claim 6, wherein said attribute includes at least one of a messaging address and a domain identifier associated with said potential message source.

8. The system of claim 1, wherein said incoming message includes at least one of a text message, a short message service message, and a media message service message.

9. The system of claim 1, wherein the access management facility is configured to:
define a life span of said access code based on user input; and
deactivate said access code based on said life span.

10. A system comprising:
at least one computing device implementing an access management facility and a message processing facility communicatively coupled to the access management facility;
the access management facility configured to
generate a pre-populated list of potential authorized message sources from messaging data in a user message box,
receive a selection, from a user, of at least one potential authorized message source from said pre-populated list of potential authorized message sources,
maintain data representing said selected potential authorized message source as one authorized message source in a set of authorized message sources,
generate and activate an access code,
transmit said access code to a potential message source, and
maintain data representing said potential message source as another authorized message source in said set of authorized message sources; and
the message processing facility configured to
receive an incoming message, and
selectively filter said incoming message based on at least one of said set of authorized message sources and said access code;
wherein the message processing facility is configured to use said data representing said set of authorized message sources as a first basis to selectively filter said incoming message by determining whether a source of said incoming message is included in said set of authorized message sources, and
when said source of said incoming message is determined not to be included in said set of authorized message sources, use said access code as a second basis to selectively filter said incoming message.

11. The system of claim 10, wherein the access management facility is configured to provide at least one tool configured to enable said user to select at least one of said potential authorized message sources from said pre-populated list of potential authorized message sources.

12. The system of claim 10, wherein the access management facility is configured to provide at least one tool configured to enable said user to manage said access code, including instructing the access management facility to activate and deactivate said access code.

13. The system of claim 10, wherein the access management facility is configured to automatically deactivate said access code after a predefined life span.

14. The system of claim 10, wherein the message processing facility is configured to:
authenticate said source of said incoming message; and
send a response message to said source of said incoming message in response to a non-delivery of said incoming message to said user, wherein said response message is configured to facilitate adding data representing said source to said set of authorized message sources.

15. A method comprising:
generating a pre-populated list of potential authorized message sources from messaging data in a user message box;
receiving a selection, from a user, of at least one potential authorized message source from the pre-populated list of potential authorized message sources;
maintaining data representing said selected potential authorized message source as one authorized message source in a set of authorized message sources;
generating and activating an access code;
transmitting said access code to a potential message source;
maintaining data representing said potential message source as another authorized message source in said set of authorized message sources;
receiving an incoming message;
determining whether a source of said incoming message is included in said set of authorized message sources;
delivering said incoming message to said user if said source of said incoming message is determined to be included in said set of authorized message sources; and
if said source of said incoming message is determined not to be included in said set of authorized message sources,
determining whether said incoming message includes said access code,
delivering said incoming message to said user if said incoming message is determined to include said access code, and
not delivering said incoming message to said user if said incoming message is determined not to include said access code.

16. The method of claim 15, further comprising:
authenticating said source of said incoming message; and
sending a response message to said source of said incoming message in response to said non-delivery of said incoming message to said user, wherein said response message is configured to facilitate adding data representing said source to said set of authorized message sources.

17. The method of claim 15, further comprising automatically deactivating said access code in response to said delivering said incoming message to said user if said incoming message is determined to include said access code.

18. The method of claim 15, further comprising deactivating said access code in response to input from said user.

19. The method of claim 15, wherein said generating includes generating said access code based at least in part on at least one attribute of said potential message source.

20. The method of claim 15, wherein said generating includes defining a life span of said access code based on input from said user.

21. The method of claim 15, wherein said determining whether said incoming message includes said access code includes validating said access code for said source of said incoming message.

22. The method of claim 15, embodied as computer-executable instructions on at least one non-transitory computer-readable medium.

23. The system of claim 10, wherein said access management facility is configured to provide said user with a choice as to which of the first basis and the second basis will be used to allow delivery of said incoming message from said source to said user.

24. The method of claim 15, further comprising providing said user with a choice as to whether the set of authorized message sources or the access code will be used as a basis for allowing delivery of said incoming message from said source to said user.

* * * * *